(12) United States Patent
Mutunga et al.

(10) Patent No.: US 6,882,514 B2
(45) Date of Patent: Apr. 19, 2005

(54) OVERCURRENT AND OVERVOLTAGE PROTECTION METHOD AND ARCHITECTURE FOR A TIP AND RING SUBSCRIBER LINE INTERFACE CIRCUIT

(75) Inventors: Charles Mutunga, Duluth, GA (US); Kenneth Everett, Hoschton, GA (US)

(73) Assignee: Arris International, Inc., Suwanee, GA (US)

( * ) Notice: Subject to any disclaimer, the term of this patent is extended or adjusted under 35 U.S.C. 154(b) by 36 days.

(21) Appl. No.: 10/237,822

(22) Filed: Sep. 9, 2002

(65) Prior Publication Data

US 2003/0053276 A1 Mar. 20, 2003

Related U.S. Application Data

(60) Provisional application No. 60/322,534, filed on Sep. 14, 2001.

(51) Int. Cl.[7] .................................................. H02H 1/00
(52) U.S. Cl. ........................................ 361/119; 361/118
(58) Field of Search ........................... 361/56, 58, 91.1, 361/110, 111, 117, 118, 119, 91, 126, 127, 120

(56) References Cited

U.S. PATENT DOCUMENTS

| | | | | |
|---|---|---|---|---|
| 4,849,846 A | * | 7/1989 | Hung et al. | 361/56 |
| 5,003,588 A | * | 3/1991 | Wingerath | 379/412 |
| 5,146,384 A | * | 9/1992 | Markovic et al. | 361/55 |
| 6,072,683 A | * | 6/2000 | Masghati | 361/119 |
| 6,285,754 B1 | * | 9/2001 | Sun et al. | 379/399.02 |
| 6,362,909 B1 | * | 3/2002 | Bedrosian | 398/171 |
| 6,606,231 B1 | * | 8/2003 | Rumer | 361/119 |

* cited by examiner

Primary Examiner—Brian Sircus
Assistant Examiner—Danny Nguyen
(74) Attorney, Agent, or Firm—John L. Doughty

(57) ABSTRACT

A circuit for protecting a plurality of tip/ring SLIC cards during over current or over voltage conditions. A diode pair corresponding to each tip/ring pair provides positive voltage over voltage protection in a negative powering scheme.

Two thyristors provide negative over voltage protection. Tip conductors of half of the SLICs connect to the cathode of one of the thyristors. The ring conductors corresponding to each of these tips connects to the cathode of the other, or second, thyristor. The remaining tips are connected to the cathode of the second thyristor. The rings corresponding to these remaining tips connect to the cathode of the first thyristor. This alternating connection of tips and rings provides twice the current capacity of a single thyristor, while cutting in half the potential holding current through either of the thyristors, thus increasing the likelihood of automatic return to normal operation following cessation of negative over voltage.

20 Claims, 2 Drawing Sheets

OVERCURRENT AND OVERVOLTAGE PROTECTION METHOD AND ARCHITECTURE FOR A TIP AND RING SUBSCRIBER LINE INTERFACE CIRCUIT

CROSS REFERENCE TO RELATED APPLICATION

This application claims the benefit of priority under 35 U.S.C. 119(e) to the filing date of Mutunga, et al., U.S. provisional patent application No. 60/322,534 entitled "Tip/Ring Complete Interface Solution", which was filed Sep. 14, 2001, and is incorporated herein by reference.

FIELD OF THE INVENTION

This invention relates, generally, to communication networks and, more particularly, providing over current and over voltage protection as well as EMI suppression in a Subscriber Line Interface Circuit ("SLIC").

BACKGROUND

In a plain old telephone service ("POTS") system network using tip ring wire pair ("TR") technology, it is desirable to protect subscriber line interface circuits ("SLIC"), an example of which typically interfaces a plurality of telephone lines with a telephone exchange network, from over voltage and over current conditions. Such over voltage and over current conditions may be the result of lightning surges, network system malfunctions or other occurrences that cause the rapid input of energy onto a TR pair. In addition, it is desirable to prevent SLICs from conducting and/or radiating electromagnetic interference ("EMI") energy.

Conventional protection device typically use either line feed resistor ("LFR") networks and/or relay devices to protect against over current and over voltage conditions. These devices may provide adequate protection to the SLIC devices, but the circuit board space they use and the cost they contribute to the overall cost of a SLIC card are not insignificant. In addition, LFR are typically thru-hole devices that present not insignificant manufacturing costs and challenges when a SLIC card is manufactured using surface mount technology ("SMT") processes.

Some attempted solutions also use switching devices, such as thyristors, for example, to shunt over voltage or over current impulses to ground when a certain predetermined energy threshold is exceeded by the over voltage or over current impulse(s). These solutions are effective, but conventionally use at least two thyristors for each TR pair. Since each thyristor occupies space on a circuit board and requires a certain amount of connection complexity to integrate into a circuit board that serves a plurality of TR pairs, the cost of the multiple thyristors used in such an arrangement is not insignificant.

With respect to EMI filtering, conventional techniques typically use capacitors of selected values to have resonant frequencies in the neighborhood of 100 MHz. While these filters provide adequate filtering of EMI, they also adversely affect voice signals having frequencies in the range of 200–3400 Hz.

Thus, there is a need in the art for protection circuitry that protects a plurality of TR pairs without the need for LFR networks or relays and that uses fewer thyristors than are used in a conventional thyristor based protection circuit. Furthermore, there is a need for a protection circuit that filters EMI without adversely affecting the quality of voice signals.

SUMMARY

It is an object to provide a protection circuit that protects a plurality of TR pairs associated with a plurality of corresponding SLICs that is easier and less costly to manufacture than conventional protection circuits.

It is also an object to provide protection circuitry that reduces circuit board area usage to facilitate the protection of a plurality of TR pairs connected to a plurality of SLICs where the protection circuit can be implemented on a single circuit board or card.

It is another object to provide EMI filtering that does not adversely affect voice quality.

Generally described, a protection circuit comprises for each TR pair a first diode pair having the anode of one connected to the tip wire ("T") and the anode of the other connected to the ring wire ("R") with the cathodes of each connected electrically to ground. The protection circuit also comprises for each tip/ring pair, a second diode pair having the anode of one diode terminating to a first node ("N1") and the anode of the other diode terminating to a second node ("N2"). A first thyristor has its cathode connected to the first node, its anode connected to ground and its gate connected to the cathode of a gate diode that is reverse biased by a negative supply voltage. A second thyristor has its cathode connected to the second node, its anode connected to ground and its gate connected to the cathode of another gate diode that is reverse biased by the negative supply voltage. It will be appreciated that the first and second thyristors and their corresponding gate diodes may be separate discrete components. Alternatively, the thyristors and their corresponding gate diodes may be packaged together as an integrated circuit; each thyristor gate and corresponding gate diode cathode may share the same semiconductor substrate layer.

The cathodes of the diodes of the second diode pair are alternatingly connected to the tip and ring wires of each successive pair of the plurality of tip/ring pairs. Thus, for example, in a system having four SLICs A, B, C and D, first diodes of two of the second diode pairs have their cathodes connected to the tip conductor of SLIC A and the tip conductor of SLIC C respectively with their anodes both connected to N2, and first diodes of the other two second diode pairs have their cathodes connected to the ring conductor of SLIC A and ring conductor of SLIC C respectively, with their anodes both connected to N1. It will be appreciated that in the immediately foregoing example, for clarity, the terms first and second are used to refer to and distinguish between diodes within a discrete diode pair. In the claims section, each diode of the circuit is referred to by a distinct numerical diode name.

To suppress EMI, chip-based ferrite beads, designed to meet Telcordia GR-1089 standards, are used. These can selectively provide a notch transfer function to attenuate substantially only at a frequency of interest, such as, for example, 100 MHz. In addition, signal attenuation around the 1 MHz frequency should be provided to mitigate against ingress of Amplitude Modulated ("AM") radio interference.

Thus, as compared to a capacitor-based filter, voice frequencies are virtually unaffected.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof. Furthermore, while some aspects of the present invention are described in detail herein, no specific conductor type, integrated circuit, discrete component, connector, enclosure, power supply, circuit board arrangement, capacitor or resistor value, or fuse rating, for example, is required to be used in the practicing of the present invention. Indeed, selection of such parts and components would be within the routine functions of a designer skilled in the art.

Figure 1:
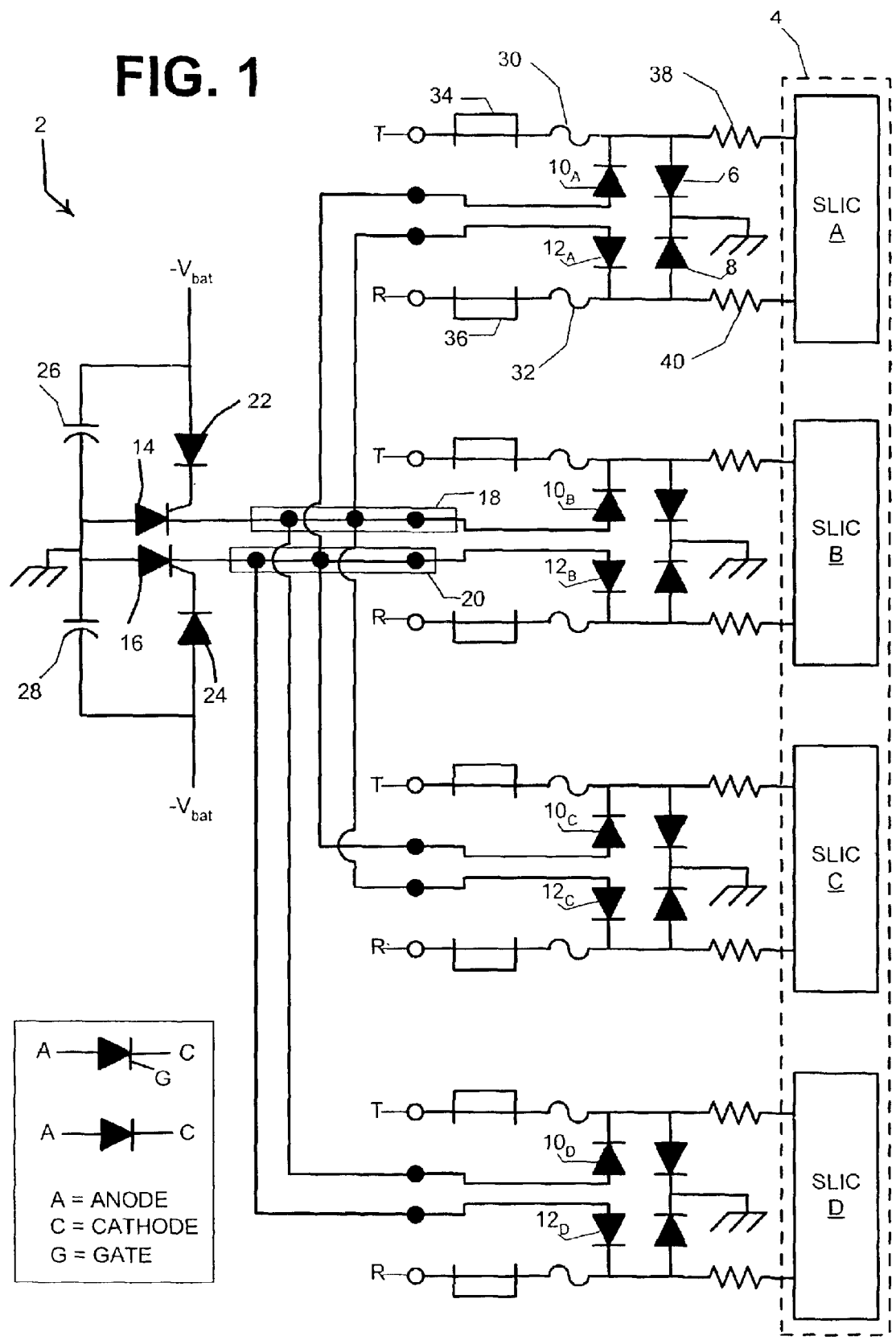
FIG. 1 illustrates a schematic diagram of a circuit used to protect a plurality of SLICs having a negative voltage powering scheme from over current and over voltage transients, surges and other signals, and to provide EMI filtering that does not affect voice frequencies.

Turning now to the figures, FIG. 1 illustrates a schematic of a protection circuit 2 that provides protection against four SLICs 4 from over current and over voltage signals. It will be appreciated that four SLICs 4 are shown in the figure for clarity, but that more or less than four can be supported by the protection circuitry. Each SLIC 4 provides an interface between a communications-network-side line and a TR pair comprising a tip line T and a ring line R.

The SLIC may be susceptible to damage from high energy signals such as would occur from, for example, lightning strikes nearby, line faults, power surges, etc. These signals that are typically substantially higher in energy than the line signals transmitted along the TR pair and typically cause either an elevated voltage or current above normal operating levels to be impressed into the TR pair. These increases above normal operating conditions are known as over currents or over voltages. The supply voltage for a typical SLIC circuit on the TR side usually falls within a range of 44 to 56 volts, with a nominal voltage of 48 V typical. Sometimes, the voltage may approach the 100 V level when in the ring mode. Thus, if the SLIC circuitry is rated at 120 V, for example, the ring mode voltage causes no harm. However, if lightning were to cause a spike that rose above 120 V, damage may occur.

In an aspect, a pair of forward biased diodes, the pair comprising a first diode 6 and a second diode 8 have their cathodes commonly connected to ground provide protection against positive over voltage energy. It will be appreciated that a TR system may have a negative supply voltage and thus, $V_{bat}$ may be −100 V, for example. First diode 6 has its anode connected to the tip wire and second diode 8 has its anode connected to the ring wire associated with SLIC A. Therefore, if a voltage that is positive with respect to ground is impressed onto either the tip or the ring wire, the first and second diodes are forward biased and the voltage will be safely shunted to ground through either first diode 6 or second diode 8 respectively.

To provide protection against a voltage that is more negative with respect to ground than −120 V, for example, as discussed above, and that is impressed into the ring wire, a second pair of diodes provide a path that safely shunts the negative over voltage to ground. It will be appreciated that a voltage impressed onto a tip wire need only be approximately negative with respect to ground for circuit 2 to operate. This is because the tip wire in a typically communications system is normally tied to ground. The phrase "approximately negative" is used to indicate that the voltage magnitude will typically be at least as great as the bias, or 'turn on', voltage of diode 6 or 8, and other devices yet to be discussed.

In reference to SLIC A, diode 10A has its cathode connected to the tip wire of SLIC A and diode 12A has its cathode connected to the ring wire of SLIC A. However, the anodes of neither are connected to ground. This is because the diodes of the second diode pair would be reverse biased with respect to ground and would continually provide a path to ground for the negative supply voltage. Thus, a switching means is used to isolate the anodes of diodes 10A and 12A from ground during normal operation.

In the preferred embodiment, the switching devices used are first thyristor 14 and second thyristor 16. The cathode of first thyristor 14 terminates at a first node 18 and the cathode of second thyristor 16 terminates at a second node 20. The anodes of first thyristor 14 and second thyristor 16 are commonly connected to ground.

To connect SLIC A to the thyristors for negative over voltage protection, the anode of third diode $10_A$ is connected to second node 20 and the anode of fourth diode $12_A$ is connected to first node 18. When a negative voltage is impressed on either the tip or the ring wire, a flow path is established between either wire and ground, as long as the negative voltage with respect to ground is at least as much as the sum of the forward bias voltage drops across the respective thyristor and corresponding diode from the second diode pair. This would continually be the case during normal operation if a diode were used in place of either thyristor because the operating voltage ("$V_{bat}$") of the TR side of the SLIC is typically a negative voltage with respect to ground. Accordingly, thyristor 14 and thyristor 16 are in an off state during normal operation so that only negligible amounts of leakage current can flow through either thyristor between ground and either the tip or ring wire of a particular SLIC circuit.

However, for protection that shunts a negative over voltage away from the SLIC, either or both of the thyristors must be turned on so that they conduct in a forward direction. Accordingly, the cathode of fifth diode 22 is connected to the gate of thyristor 14 and the cathode of sixth diode 24 is connected to the gate of thyristor 16. Thus, when the voltage impressed on the tip and/or ring wire reaches negative value with respect to ground that exceeds a predetermined value, either fifth diode 22 or sixth diode 24, or both, are forward biased and begin to conduct. When either fifth diode 22 or sixth diode 24 conduct in a forward direction, thyristor 14 or thyristor 16 respectively are turned on and also begin to conduct. This creates a flow bath between ground and the tip and/or ring wire that is in a negative over voltage condition.

It will be appreciated that fifth diode 22 and thyristor 14 may be discrete components or may be packaged together as an integrated circuit. Similarly, gate diode 24 and second thyristor 16 may be packaged together. Furthermore, both thyristor/diode combinations may be packaged together in the same integrated circuit.

First capacitor 26 and second capacitor 28 are used to ensure rapid triggering of thyristors 14 and 16 respectively. Thus, current due to the negative over voltage is rapidly and safely shunted to ground before damage to SLIC A occurs. After either thyristor begins to conduct, it will stay on as long as the negative over voltage condition exists. This is because as long as the thyristor is forward biased and conducting current, the current, also referred to as the holding current of the thyristor, keeps the thyristor in an on state.

For example, with respect to the ring wire corresponding to SLIC A, if a voltage that is more negative than $-V_{bat}$ minus (or plus the negative of) the forward bias voltage drop across diodes $12_A$ and 22 is impressed onto the ring wire, both diodes conduct in a forward direction. The current flowing through diode 22 triggers thyristor 14 and current due to the over voltage condition is shunted to ground. When the cause of the over voltage condition subsides and the ring wire voltage returns to normal supply voltage of typically –48 V, diode 22 turns off and stops conducting. However, thyristor 14 is still on and conducting as long as a threshold current (holding current) is flowing through it in a forward direction. When the current that the ring lead is sinking from ground through thyristor 14 drops below the holding current threshold of the thyristor, the thyristor stops conducting and the SLIC circuitry returns to normal operating mode.

Since it is desirable to return the SLIC to normal operating mode as soon as possible after an over voltage condition subsides, the plurality of TR wire pairs are connected alternatingly to nodes 18 and 20. If each tip wire were connected through a corresponding diode to node 18 and each ring wire were connected to node 20, for example, the protection circuitry 2 might take longer to return the SLIC circuits to normal operating mode. This is because if, for example, all the plurality of ring wires had a negative over voltage condition, and consequently all of the ring wires were sinking current from ground through a single thyristor, then all of the rings would be contributing to the holding current flowing through the same single thyristor, thereby reducing the likelihood that the holding current would drop below the cutoff threshold.

By connecting the TR wire pairs alternatingly to first node 18 and second node 20, only half of the ring wires corresponding to the plurality of SLICs protected by circuitry 2 would contribute to the holding current thorough one of the thyristors. The other half of ring wires would be connected to the other thyristor. Therefore, the current being sunk by the ring wires, for example, would be more likely to drop below the holding current threshold and return the SLICs to normal operating mode automatically following cessation of an over voltage condition. Moreover, during a sustained over voltage condition where the holding current continues for more than a brief moment, temperature of the thyristor switching devices will typically rise. This causes the inherent holding current threshold to drop, thus meaning that the holding current must drop even lower before the thyristor will automatically turn off. In such a case, the advantage of sharing thyristors between SLICs as provided by the alternatingly connected tip/ring pair arrangement is further advantageous.

Generally, during normal operation, the tip leads, which are also alternatingly connected to nodes 18 and 22, are at ground potential and therefore should not contribute to the holding current after a negative over voltage condition ceases.

In addition to the benefit of reduced holding current sunk by the plurality of ring wires after an over voltage condition ceases, having two thyristors to sink current from ground, even through the tip wires, during a negative over voltage event doubles the current carrying capacity over a circuit that uses a single thyristor for all tip and ring wires.

For providing over current protection, fuses 30 and 32 are placed in series between the wire and the SLIC for each tip wire and ring wire, respectively. Each fuse is selected to be robust enough to withstand first-level lightning surges and AC power fault conditions, and enter an open circuit condition upon the occurrence of second-level surges or fault conditions. For pole-mounted applications, positive temperature coefficient ("PTC") devices having a resistance of approximately 5 ohms can be implemented instead of fuses 30 and 32. A PTC device, known in the art, provides circuit protection by changing from a low resistance state to a high resistance state in response to an over current that exceeds a predetermined current level. This limits the surge current to be within the carrying capability of the thyristor device. After the over current condition has subsided, the PTC returns to its low resistance state.

To suppress EMI emissions, chip-based ferrite bead devices 34 and 36 are also implemented in series with the tip and ring wires respectively. Unlike general-purpose inductors, ferrite bead devices, known in the art, are designed to have small stray capacitance. Thus, signal distortion is minimized. As signal frequency rises, the impedances of ferrite bead devices 34 and 36 increase. Accordingly, electromagnetic interference to the SLIC and customer premise equipment is prevented by dissipating noise in the form of heat. The ferrite bead impedance gradient is selected based on an impedance versus frequency curve so as to not adversely impact the voice operating frequency band.

Fuse/PTC devices 30 and 32 and the chip ferrite bead devices 34 and 36 are selected to be robust enough to meet Telcordia GR-1089 first-level and second-level lightning surges and AC power fault performance requirements.

Current limiting battery feed resistors 38 and 40 are placed in series with the tip and ring wires respectively. As resistors 38 and 40 are in series with the tip and ring wires, respectively, between the protection circuit and the corresponding SLIC, they may be selected to have a low power rating. The rating for resistors 38 and 40 may be approximately one-half watt. Thus, accuracy is increased and cost and space requirements are decreased vis-à-vis line feed resistors found in conventional protection circuits.

Figure 2:
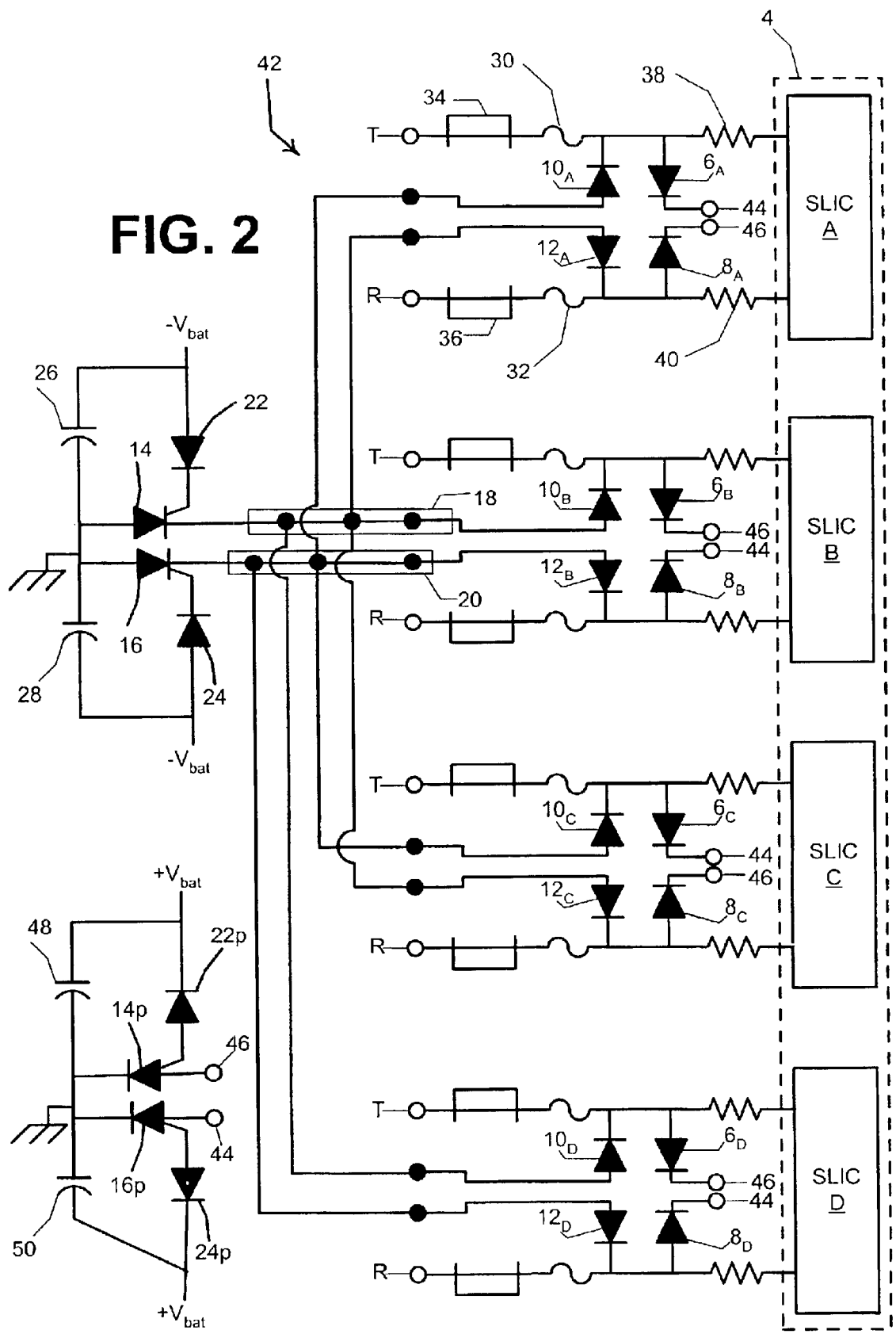
FIG. 2 illustrates a schematic diagram of a circuit used to protect a plurality of SLICs having a positive voltage powering scheme from over current and over voltage transients, surges and other signals, and to provide EMI filtering that does not affect voice frequencies.

Turning now to FIG. 2, a circuit schematic is illustrated for protecting a SLIC where the powering scheme is positive. In other words, $V_{bat}$ is positive with respect to ground, as opposed to negative, as is shown in FIG. 1 where $V_{bat}$ is negative, or $-V_{bat}$. While the negative-voltage-powering scheme is the most widely used, as traditional telephone systems operate on negative power supply voltage, there are a few scenarios where a positive scheme is used.

Thus, to provide over voltage protection similar to the protection provided by the circuit as illustrated in FIG. 1, some modifications are implemented. The modified circuit 42 is illustrated in FIG. 2. Diodes 6 and 8 are still used to conduct positive over voltage transients to ground. However, the cathodes of diodes 6 and 8 are not commonly grounded. If they were so grounded, the positive ring voltage supply would always be shorted to ground, as diode 8 would be positively biased. Thus, the cathodes of diodes 6 and 8 are alternatingly connected to nodes 44 and 46 such that the cathodes of diodes 6 corresponding to SLICs A and C are connected to node 44 and the cathodes of diodes 6 corresponding to SLICs B and D are connected to node 46. Likewise, the cathodes of diodes 8 corresponding to SLICs A and C are connected to node 46 and the cathodes of diodes 8 of SLIC B and D are connected to node 44. This provides the advantages of alternating connectivity as described above in the discussion of FIG. 1 with respect to diodes 10 and 12 insofar as current due to over voltage conditions on the tip an ring wire pairs are shared by thyristors $14_p$ and $16_p$. In addition, similar to said discussion with respect to FIG. 1, the holding current is reduced through either thyristor. Thus, after cessation of an over voltage condition on the tip and ring wires, the holding current through either thyristor is more likely to drop below the trigger level of the thyristor and thus return the SLIC or SLICs to normal operating mode automatically.

To trigger thyristors $14_p$ and $16_p$, gate diodes $22_p$ and $24_p$, respectively, provide trigger current when the positive over voltage condition on one of the ring wires exceeds $V_{bat}$ plus the bias voltage of either diode 6 or 8 as applicable and the corresponding gate diode $22_p$ or $24_p$. When either diode $22_p$ or $24_p$ turns on thyristor $14_p$ or $16_p$ respectively, the over voltage energy is shunted to ground. Similarly, although the tip wires are normally at ground potential, either thyristor will trigger when the tip wire over voltage causes the potential on the tip wire to exceed the bias voltage of the corresponding diode from the first diode pair and the corresponding gate diode. Capacitors 48 and 50 may be used to provide rapid triggering of thyristors $14_p$ and $16_p$ respectively.

As with the description above in the discussion of FIG. 1, gate diodes $22_p$ and $24_p$ and thyristors $14_p$ and $16_p$ respectively, may be discrete components or may be pre-packaged as an integrated circuit. It will be appreciated that with respect to implementation/packaging of diodes 22 and 24 with thyristors 14 and 16 respectively, and $22_p$ and $24_p$ with $14_p$ and $16_p$ respectively, the general concept is to provide a switched unidirectional current conducting device that provides a path from the protected conductor to ground when switched on. While a thyristor, in conjunction with a diode, has been referenced as the preferred switched current conducting device, those skilled in the art will appreciate that a combination of a transistor in conjunction with thyristor may also be used to provide a switched ground path. Integrated circuit packages consisting of a thyristor plus diode, and/or thyristor plus transistor are readily available from numerous SLIC protection device manufacturers, such as, for example, Texas Instruments, Teccor Electronics, ST microelectronics and Semtech Corporation.

It will also be appreciated that the SLIC line card protection provided by circuit 2 illustrated in FIG. 1 and circuit 42 illustrated in FIG. 2 are conventionally known in the art as providing secondary protection. Corresponding external protection known as primary protection consists of TVS diodes that are typically located external to the line card. The primary protection typically limits the voltage at the tip/ring conductors to 350V. This allows thyristors 22, 24, $22_p$ and/or $24_p$ to protect more SLICs than the four illustrated in the figures because the maximum current that will be drawn through either given thyristor is inherently and predictably limited by the internal resistances of the combined particular thyristor and corresponding diode that provide a protective switched path from tip(s) and/or the ring(s) conductors to ground during an over voltage event. Thus, based on the current ratings of commercially available discrete or pre-packaged thyristor/diode devices, more than four SLIC cards can be protected by the circuitry illustrated in either FIG. 1 or FIG. 2.

What is claimed is:

1. A protection circuit for protecting a plurality of tip/ring-pair subscriber line interface circuits ("SLIC") comprising:
   a first switching means for shunting energy to ground having a cathode connected to a first node, an anode connected to ground and a gate connected to the cathode of a first gate diode that is reverse biased by a negative supply voltage; and
   a second switching means for shunting energy to ground having a cathode connected to a second node, an anode connected to ground and a gate connected to the cathode of a second gate diode that is reverse biased by the negative supply voltage, the first and second nodes being alternatingly connected to the tip and ring wires of each successive pair of the plurality of tip/ring pairs.

2. The protection circuit of claim 1 further comprising for each tip/ring pair, a positive-voltage diode-pair having a third diode and a fourth diode, the anode of the third diode being connected to the tip wire and the anode of the fourth diode being connected to the ring wire, the cathodes of each being connected to ground; and
   for each tip/ring pair, a second diode pair having a fifth diode and a sixth diode, the cathode of the fifth diode being connected to the tip wire and the cathode of the sixth diode being connected to the ring wire with the anodes of the fifth and sixth diodes being alternatingly connected to the first and second nodes.

3. The protection circuit of claim 1 wherein the switching means are thyristors.

4. The protection circuit of claim 1 wherein the switching means are transistors.

5. The protection circuit of claim 1 further comprising a first over current protection means serially connected between the tip conductor and the SLIC and a second current protection means serially connected between the ring conductor and the SLIC.

6. The protection circuit of claim 5 wherein the first and second over current protection means is a fuse.

7. The protection circuit of claim 6 wherein the fuse is selected to comply with Telcordia GR-1089 standards.

8. The protection circuit of claim 5 wherein the over current protection means is a positive temperature coefficient device.

9. The protection circuit of claim 1 further comprising a first ferrite bead device serially connected between the tip conductor and the SLIC and a second ferrite bead device serially connected between the ring conductor and the SLIC.

10. The protection circuit of claim 1 further comprising a first battery feed resistor serially connected along the tip conductor between the SLIC and the point by which the tip conductor connects to its corresponding node and a second battery feed resistor serially connected along the ring conductor between the SLIC and the point by which the ring conductor connects to its corresponding node.

11. A protection circuit for protecting a plurality of tip/ring-pair subscriber line interface circuits ("SLIC") having a positive powering scheme comprising:
   a first switching means for shunting negative potential energy to ground having a cathode connected to a first node, an anode connected to ground and a gate connected to the cathode of a first gate diode that is reverse biased by a negative supply voltage;

a second switching means for shunting negative potential energy to ground having a cathode connected to a second node, an anode connected to ground and a gate connected to the cathode of a second gate diode that is reverse biased by the negative supply voltage, the first and second nodes being alternatingly connected to the tip and ring wires of each successive pair of the plurality of tip/ring pairs;

a third switching means for shunting positive potential energy to ground having an anode connected to a third node, a cathode connected to ground and a gate connected to the anode of a third diode that is reverse biased by a positive supply voltage; and a fourth switching means for shunting positive potential energy to ground having an anode connected to a fourth node, a cathode connected to ground and a gate connected to the anode of a fourth diode that is reverse biased by the positive power supply, the third and fourth nodes being alternatingly connected to the tip and ring wires of each successive pair of the plurality of tip/ring pairs.

12. The protection circuit of claim 11 further comprising for each tip/ring pair, a positive-voltage diode-pair having a fifth diode and a sixth diode, the fifth diode having its anode connected to the tip wire and the sixth diode having its anode connected to the ring wire, the cathodes of each being alternatingly connected to third and fourth nodes; and for each tip/ring pair, a second diode pair having a seventh diode and a eighth diode, the cathode of the seventh diode connected to the tip wire and the cathode of the eighth diode connected to the ring wire with the anodes of the seventh and eighth diodes being alternatingly connected to the first node and the second node.

13. The protection circuit of claim 11 wherein the switching means are thyristors.

14. The protection circuit of claim 11 wherein the switching means are transistors.

15. The protection circuit of claim 11 further comprising a first over current protection means serially connected between the tip conductor and the SLIC and a second current protection means serially connected between the ring conductor and the SLIC.

16. The protection circuit of claim 15 wherein the first and second over current protection means is a fuse.

17. The protection circuit of claim 16 wherein the fuse is selected to comply with Telcordia GR-1089 standards.

18. The protection circuit of claim 15 wherein the over current protection means is a positive temperature coefficient device.

19. The protection circuit of claim 11 further comprising a first ferrite bead device serially connected between the tip conductor and the SLIC and a second ferrite bead device serially connected between the ring conductor and the SLIC.

20. The protection circuit of claim 11 further comprising a first battery feed resistor serially connected along the tip conductor between the SLIC and the point by which the tip conductor connects to its corresponding third or fourth node and a second battery feed resistor serially connected along the ring conductor between the SLIC and the point by which the ring conductor connects to its corresponding third or fourth node.

* * * * *